(12) United States Patent
Benoit et al.

(10) Patent No.: US 6,497,492 B1
(45) Date of Patent: Dec. 24, 2002

(54) BACK-LIGHTING SYSTEM FOR A TRANSMISSIVE ELECTROOPTIC MODULATOR USING THE LIGHT POLARIZATION EFFECT

(75) Inventors: Pascal Benoit, Stuttgart (DE); Jean-Michel Carle, Pipriac (FR)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/146,475

(22) Filed: Sep. 3, 1998

(30) Foreign Application Priority Data

Oct. 3, 1997 (FR) .............................................. 97 12315

(51) Int. Cl.⁷ .............................................. G02F 1/133
(52) U.S. Cl. .............................. 362/19; 362/31; 349/62; 349/65; 359/237
(58) Field of Search ........................... 362/31, 19, 330, 362/328; 359/245, 246, 251, 315, 318, 240, 237; 349/96, 62, 63, 65, 67

(56) References Cited

U.S. PATENT DOCUMENTS

| | | | |
|---|---|---|---|
| 4,763,995 A | * 8/1988 | Katagiri et al. | 350/341 |
| 5,099,343 A | * 3/1992 | Margerum et al. | 362/31 |
| 5,283,600 A | * 2/1994 | Imai | 359/40 |
| 5,712,694 A | * 1/1998 | Taira et al. | 349/9 |
| 5,751,384 A | * 5/1998 | Sharp | 349/18 |

FOREIGN PATENT DOCUMENTS

| | | | |
|---|---|---|---|
| JP | 59222818 | * 12/1984 | 349/106 |
| WO | WO96/16292 A1 | 5/1996 | |

OTHER PUBLICATIONS

C–Y. Tai and H. Zou, "A Backlighting Assembly Utilizing Microprisms For High Energy Efficiency," *SID 94 Applications Digest*, Jun. 14, 1994, pp. 10–13.
Patent Abstracts of Japan: Abstract for JP 01–61724, which was published on Aug. 3, 1989.
Patent Abstracts of Japan: Abstract for JP 04–184429, which was published on Jan. 7, 1992.
Preliminary Search Report for counterpart French patent application No. 9712315.

* cited by examiner

*Primary Examiner*—Thomas M. Sember
(74) *Attorney, Agent, or Firm*—Joseph S. Tripoli; Harvey D. Fried; Joseph J. Kolodka

(57) ABSTRACT

The present invention relates to a back-lighting system for a transmissive electrooptic modulator using the light polarization effect.

The system comprises a means for generating light rays, a reflector for sending the rays back in a direction x and means for guiding the light rays towards the electrooptic modulator, with a reflective linear polarizing film positioned in front of the said means for guiding the light rays.

The invention applies to projection.

13 Claims, 4 Drawing Sheets

BACK-LIGHTING SYSTEM FOR A TRANSMISSIVE ELECTROOPTIC MODULATOR USING THE LIGHT POLARIZATION EFFECT

BACKGROUND OF THE INVENTION

The present invention relates to a back-lighting system for a transmissive electrooptic modulator using the light polarization effect.

Transmissive electrooptic modulators using the light polarization effect, such as, for example, liquid-crystal screens of the twisted nematic type, require for their operation a pair of polarizers which are positioned at the input and at the output of the modulator, respectively. When the transmissive electrooptic modulator is used in direct viewing mode, the polarizer 1 positioned at the input of the modulator is illuminated by unpolarized light 2, as shown diagrammatically in FIG. 1. Since the polarizer only transmits correctly polarized light rays, an absorption of approximately 60% of the total light flux is observed. Moreover, when transmissive electrooptic modulators using the light polarization effect are used in direct viewing mode, a large variation is observed in the contrast and brightness characteristics, depending on the viewing angle.

In order to remedy these drawbacks, it has been proposed to illuminate the electrooptic modulator by collimated light. A system of this type is illustrated diagrammatically in FIG. 2. In this figure, the reference 10 denotes the light source which may be produced by a cold-cathode fluorescent tube or a similar device. The reference 11 denotes a reflector sending the light rays back in the direction referenced x, the reference 12 denotes a light pipe or waveguide, the reference 13 denotes a microprismatic structure and the reference 14 denotes the viewing angle of the light rays at the output. Moreover, a collimation section 15 may be provided between the reflector and the input of the waveguide 12.

With this structure, as illustrated in FIG. 3, the light emitted by the tube 10 is sent back by the reflector 11 in the direction x into the waveguide 12. In this case, the light rays reflected by the reflector 11 pass through the collimation section, producing a first collimation in the xy plane, and are then sent into the waveguide 12. In the guide, the rays emanating from the collimation region 15 are reflected by total reflection off the upper face opposite the microprismatic structure 13, towards this structure, and are then reflected by specular reflection off the said microprismatic structure 13 so as to leave the waveguide approximately perpendicularly through the upper face towards the electrooptic modulator (not illustrated). The path of the light rays is illustrated by the arrows 1 and 1'. With this structure, the light flux is scattered mono-directionally at the output of the electrooptic modulator, thereby making it possible to improve the contrast characteristics.

SUMMARY OF THE INVENTION

The object of the present invention is specially, but not exclusively, to improve this type of structure so as to obtain a novel system having a high luminance gain.

The subject of the present invention is therefore a back-lighting system for a transmissive electrooptic modulator using the light polarization effect, comprising at least one means for generating light rays, at least one reflector for sending the light rays back in a first direction x and means for guiding the light rays towards the electrooptic modulator, characterized in that it includes a reflective linear polarizing film positioned in front of the said means for guiding the light rays.

Preferably, the orientation of the reflective linear polarizing film and the means for guiding the light rays are chosen so that the state of polarization of the light remains unchanged from the input to the output of the said means. This is because, from the laws of reflection, a polarization exists which is not disturbed too much by the multiple reflections inside the guiding means. Depending on the coordinate system chosen, if the output of the rays is along z, this preferred polarization is the polarization along y.

With this system, back-lighting is created such that the light rays have a linear polarization favourable to transmission through the polarizer. In addition, the rays emanating from the means for generating light rays or light source, as soon as they have this polarization, keep it throughout the propagation in the means for guiding the light rays towards the electrooptic modulator, the rays which do not have this state being recycled.

According to a preferred embodiment of the present invention, the reflective linear polarizing film, which constitutes a prepolarization and polarization return means, is a thin-layer film which transmits a linear polarization of given optic axis and which reflects all the others. Preferably, this film consists of the film sold by the company 3M under the trademark "DBEF".

According to another characteristic of the present invention, the means for guiding the light rays consist of a waveguide positioned at the output of the reflector so as to transport the light rays in the x direction, one of the faces of the waveguide, parallel to the x direction, having a microprismatic structure which specularly reflects the light rays and extracts them from the waveguide in a second direction, referenced z, perpendicular to the first direction.

Thus, inside the waveguide, the light propagates by total reflection off the upper plane surface of the waveguide and is extracted from the waveguide by reflection off the microprismatic structures. Since the reflections occur mostly in the plane, the linear polarization least affected during the propagation is therefore that along the y axis, i.e. the p polarization for the microprisms.

According to another characteristic of the present invention, the system includes a prismatic film which is oriented so as to be perpendicular to the means for generating light rays and is positioned between these generating means and the reflective linear polarizing film. The function of this film is to increase the luminance at the centre. The film used in this case may be the film sold by 3M under the trademark "BEF" or similar films sold by Japanese companies.

Moreover, a half-wave retardation plate is positioned at the output of the means for guiding the light rays. This half-wave retardation plate makes it possible to preserve the linearity of the output polarization and ensures 45° azimuthal rotation towards the optic axis of the input polarizer.

BRIEF DESCRIPTION OF THE DRAWINGS

Other characteristics and advantages of the present invention will appear on reading the detailed description given below of a preferred embodiment, this description being made with reference to the drawings appended hereto, in which.

DESCRIPTION OF A PREFERRED EMBODIMENT

Figure 4:
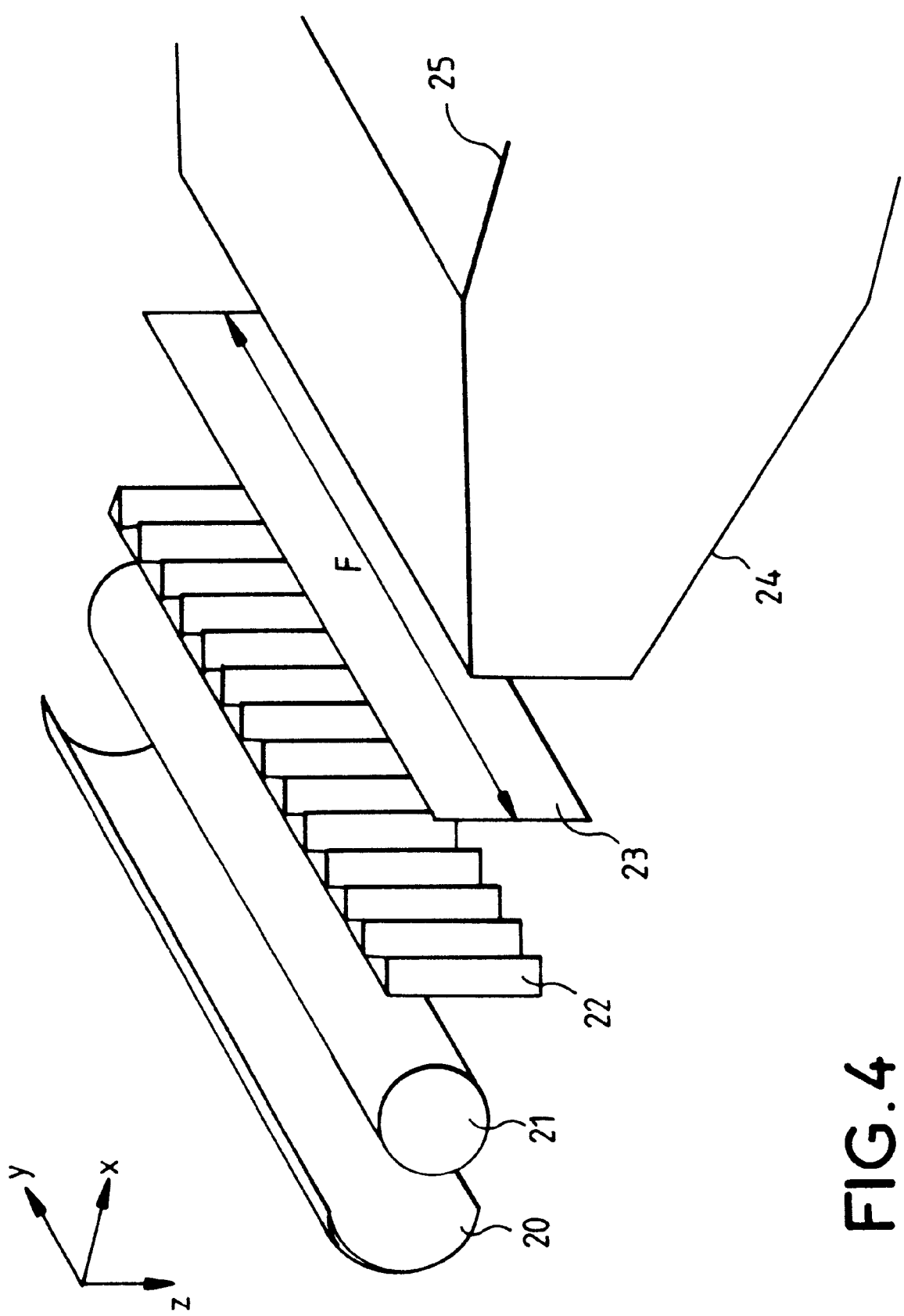
FIG. 4 is a perspective view of a back-lighting system according to the present invention.

FIG. 4 illustrates a perspective view of a back-lighting system according to a preferred embodiment of the present invention. In this figure, the reference 20 denotes a reflector of approximately cylindrical shape so as to surround a light tube 21 constituting the light source. In a known manner, this light tube 21 may be a cold-cathode fluorescent lamp or any equivalent system. The rays emitted by the light tube 21 are sent back by the reflector 20 in the x direction, shown symbolically by the orthogonal coordinate system x, y, z illustrated in the figure. According to one characteristic of the invention, a prismatic film 22 oriented perpendicular to the light tube 21 is provided after the tube on the path of the light rays. The function of this prismatic film is to increase the luminance at the centre of the system. By way of example, the film sold by 3M under the trademark "BEF" may be used as the prismatic film.

According to the main characteristic of the present invention, a reflective linear polarizing film 23 is positioned so as to be parallel to the prismatic film and after the said film on the path of the light rays. The reflective polarizing film 23 is oriented along the direction of the arrow F so that the rays emanating from the tube 21 having the polarization F pass through the film, the other rays being recycled. The rays which have passed through the film 23 are then sent into a means for guiding the light rays, consisting, as illustrated in FIG. 4, of a collimation section 24 followed by an actual waveguide 25 of parallelepipedal cross-section in the embodiment shown in FIG. 4. The waveguide 25 has, on its upper face, a microprismatic structure (not illustrated) so that the rays are reflected in the z direction given by the orthogonal coordinate system towards an electrooptic modulator (not illustrated). In the present description, a parallelepipedal waveguide is used, but it is obvious to those skilled in the art that waveguides having other shapes may be used, especially guides in which the surface having the microprisms is curved, as described in French Patent Application No. 97/06462 of May 27, 1997 in the name of the Applicant.

By way of example, a reflective linear polarizing film which can be used in the present invention and gives particularly useful results is the film sold by the company 3M under the trademark DBEF.

Figure 1:
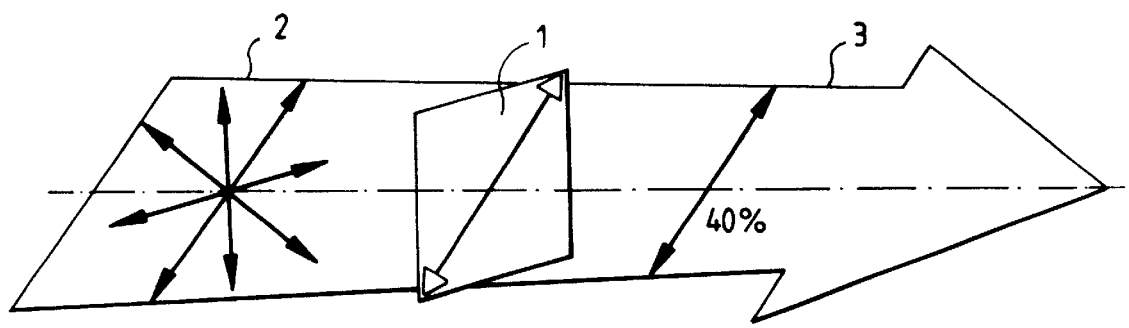
FIG. 1 already described is a diagram explaining the operation of a polarizer on unpolarized light.
Figure 2:
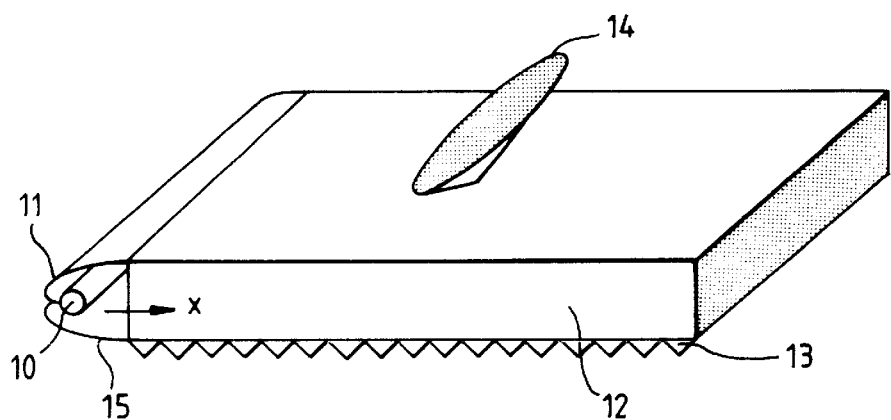
FIGS. 2 and 3 are a perspective view and a cross-sectional view, respectively, of a back-lighting system according to the prior art.
Figure 3:
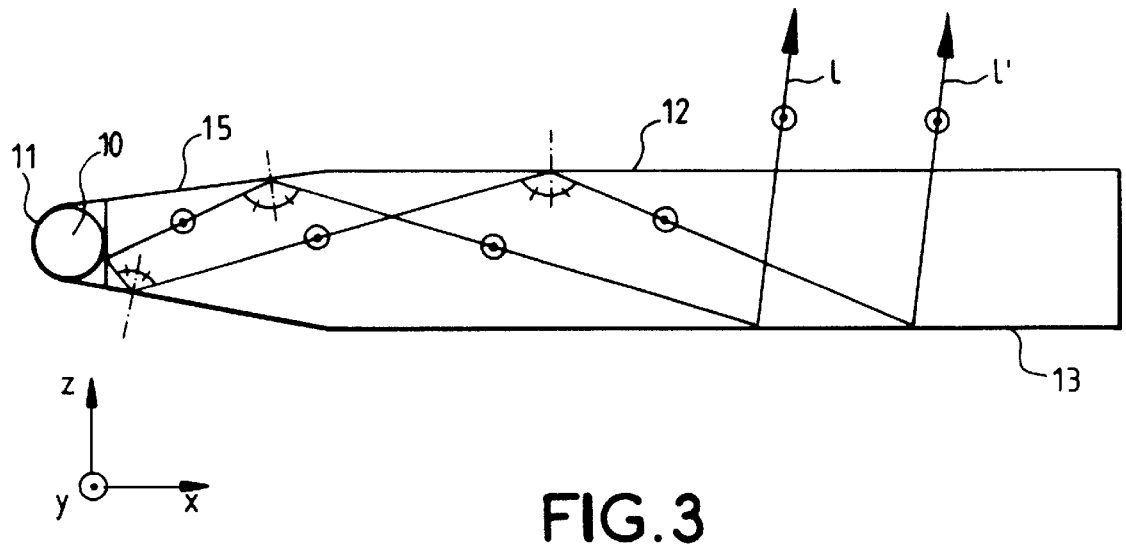

In order to show the advantages of the back-lighting system according to the present invention compared with a system of the type illustrated in FIG. 2, a certain number of measurements have been carried out using a polarization analyser. The following parameters were compared:

percentage of polarized light contained in the output beam;
ellipticity of the polarization;
azimuth with respect to Oy of the polarization.

The results obtained are given in Table 1 below.

| Structure | % Polarized light | Ellipticity | Azimuth/Oy |
| --- | --- | --- | --- |
| Collimated (FIG. 2) | 2–4% | 4° | 0°–10° |
| Coll. + prepol. + pol. return (FIG. 4) | 85–90° | 0.40–4° | 0°–2° |

The results given in the table therefore show that the desired polarization effect is indeed achieved since more than 85% of the output light is polarized. Moreover, the azimuth, which is very close to 0°, and the very low ellipticity show that, on the output side of the guide, the light is almost linear and well oriented.

Figure 6A:
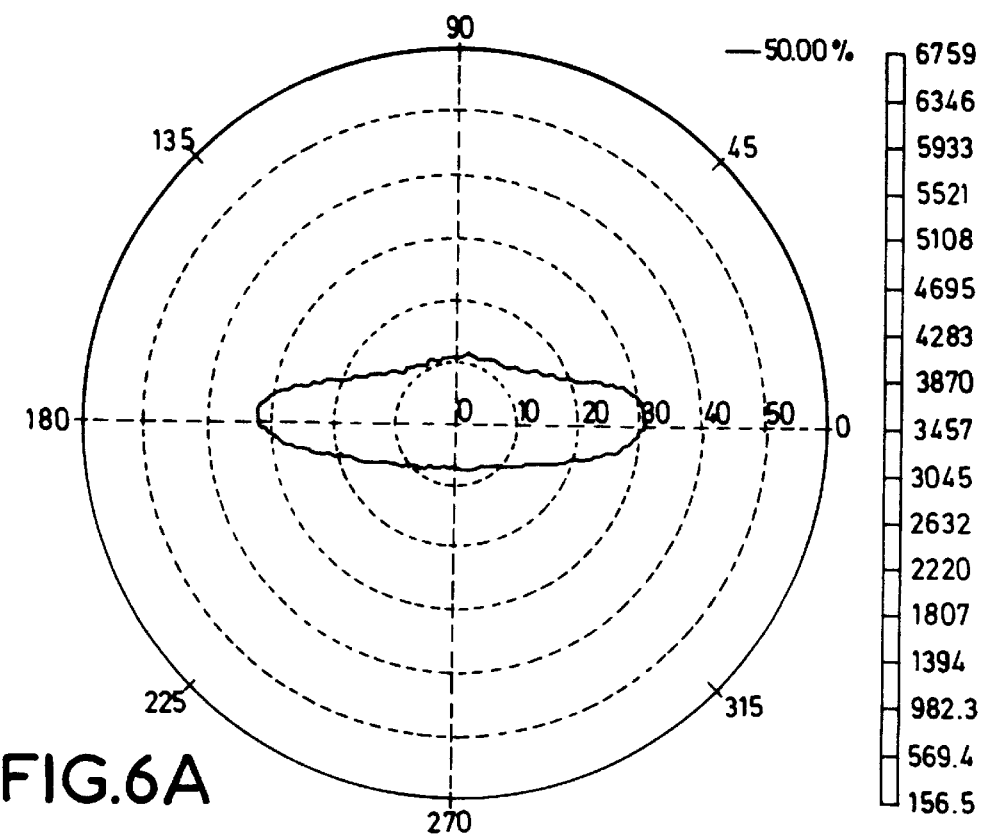
FIGS. 6A and 6B are conoscopes giving the luminance for the back-lighting systems of FIG. 2 and FIG. 4, respectively.
Figure 6B:
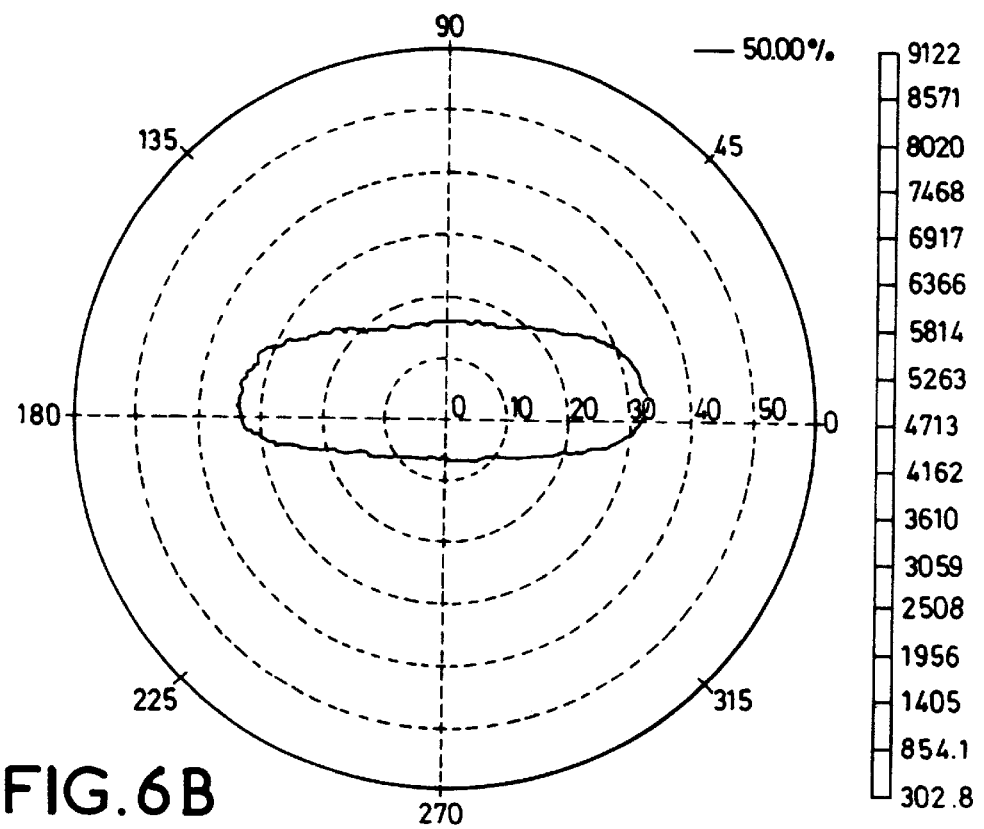

In addition, in order to analyse the luminance gain obtained by the "polarization return" effect of the reflective linear polarizing film, a polarizer is cemented onto the output face of the waveguide with its transmission axis parallel to the polarization extracted from the guide. The results obtained in the case of a system of the prior art, such as that shown in FIG. 2, and in the case of a system according to the present invention are illustrated by the conoscopes given in FIGS. 6A and 6B. The scale on the curves gives the minimum and maximum values, showing that, in the case of curve 6B, the maximum is much greater. Moreover, the central curve represents the 50% performance of the two systems.

The operation of the system according to the present invention is therefore as follows. The light is emitted by the tube 21 and then recentered by the crossed prismatic film 22. Approximately 42% of the light is transmitted in the form of linear polarization along Oy which enters the waveguide, while the rest is reflected towards the tube and the reflector in order to be recycled thereat. Light therefore returns through the linear polarizing film 23 and the prismatic film 22, and again 42% of the energy will be transmitted in the form of Oy-oriented linear polarization, and so on. Consequently, as illustrated in the conoscopes, an increase in the luminance is observed.

Figure 5:
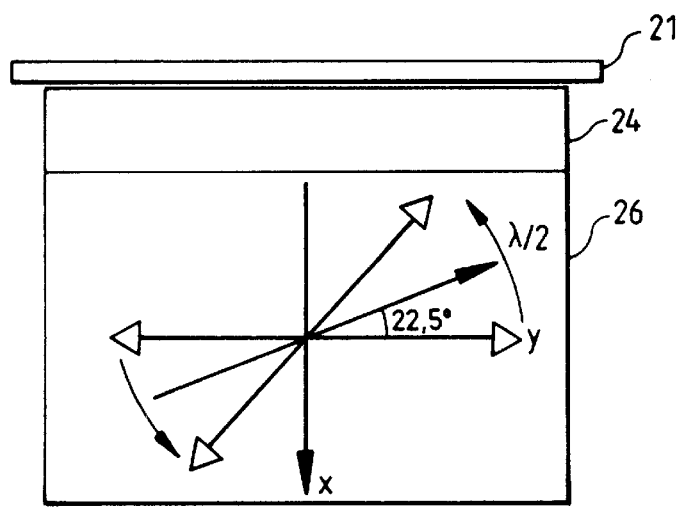
FIG. 5 is a diagrammatic top view showing the arrangement of a half-wave plate on the waveguide illustrated in FIG. 4.

According to another characteristic of the present invention, a half-wave retardation plate 26, which preserves the linearity of the Oy-oriented output polarization and ensures 45° azimuthal rotation thereof towards the optic axis of the input polarizer, is laminated onto the output surface of the waveguide as illustrated in FIG. 5.

This allows better adaptation to electrooptic modulators consisting generally of liquid-crystal screens whose brushing directions, namely the alignment of the terminal molecules, are oriented at 45° and 135° with respect to the Oy axis.

Thus, with the back-lighting system according to the present invention, a very wide viewing angle is observed with a good contrast level, and the vertical grey-level inversions are eliminated. Moreover, an increase of more than 40% in the luminance of the screen is observed, thereby giving a more agreeable image and the possibility of reducing the power of the light source, namely the electrical consumption. Likewise, it is also possible to increase the maximum contrast of the liquid-crystal screen by more than 20%, especially by using the half-wave retardation plate.

What is claimed:

1. Back-lighting system comprising:
   a source of light;
   a reflector for redirecting light from said source towards the direction of light emitted by said source away from said reflector;
   a single thin reflective linear polarizing element receiving both light emitted by said source and light redirected by said reflector, said reflective linear polarizing element passing light linearly polarized in a given optic axis and reflecting light not polarized in said given optic axis, said single thin reflective linear polarizing element (being a prepolarization and polarization return means) giving a one direction oriented linear polarization;

a waveguide for guiding light passed by said reflective linear polarizing element towards an electro-optic modulator, said waveguide and said thin reflective linear polarizing element being oriented for maintaining substantially the same polarization of said light passed by said thin reflective linear-polarizing element and guided by said waveguide.

2. Back-lighting system according to claim 1, wherein said polarization of said light passed by said reflective linear polarization element and into and out of said waveguide provides substantially total internal reflection of said light within said waveguide.

3. Back-lighting system according to claim 1, wherein said waveguide comprises a portion for initially collimating said light passed by said reflective linear polarization element.

4. Back-lighting system according to claim 1, further comprising a prismatic element optically interposed between said source of light and said reflective linear polarization element, said prismatic element being oriented optically perpendicular to said source of light.

5. Back-lighting system according to claim 1, further comprising a halfwave retardation plate positioned at the output of said waveguide.

6. Back-lighting system according to claim 1, wherein said electrooptic modulator is a liquid-crystal screen.

7. Back-lighting system for a transmissive electro-optic modulator using light polarization effect, comprising:

means for generating light rays, a reflector for sending the light rays back in a first direction, and means for guiding the light rays towards the electro-optic modulator, a single thin reflective linear polarizing film positioned between said means for generating light rays and said means for guiding the light rays, said single thin reflective linear polarizing film, giving one direction oriented linear polarization, said means for guiding the light rays consisting of a waveguide positioned at the output of the reflector so as to transport the light rays in the first direction, one of the faces of the waveguide, parallel to the first direction, having a microprismatic structure which specularly reflects the light rays and extracts them from the waveguide in a second direction perpendicular to the first direction.

8. The system according to claim 1, the orientation of the reflective linear polarizing film and the means for guiding the light rays are such that the state of polarization of the light remains unchanged from the input to the output of the said means for guiding the light rays.

9. System according to claim 1, the reflective linear polarizing film consists of the film sold by the company 3M under the trademark "DBEF".

10. System according to claim 1, wherein a collimation means lies between the reflective linear polarizing film and the means for guiding the light rays.

11. System according to claim 1, further comprising a prismatic film which is oriented so as to be perpendicular to the means for generating light rays and is positioned between the generating means and the reflective liner polarizing film.

12. System according to claim 1, further comprising a half-wave retardation plate positioned at the output of the means for guiding the light rays.

13. System according to claim 1, electro-optic modulator is a liquid-crystal screen.

* * * * *